United States Patent
Zhang et al.

(10) Patent No.: US 11,846,538 B2
(45) Date of Patent: Dec. 19, 2023

(54) VIBRATING FORK LEVEL SWITCHES

(71) Applicant: Rosemount Tank Radar AB, Mölnlycke (SE)

(72) Inventors: Jingdong Zhang, Slough (GB); Tadewos Tzegazeab, Wokingham (GB); Andrew David Mackrell, Basingstoke (GB)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 228 days.

(21) Appl. No.: 17/419,770

(22) PCT Filed: Feb. 7, 2020

(86) PCT No.: PCT/GB2020/050288
§ 371 (c)(1),
(2) Date: Jun. 30, 2021

(87) PCT Pub. No.: WO2020/165560
PCT Pub. Date: Aug. 20, 2020

(65) Prior Publication Data
US 2022/0082428 A1  Mar. 17, 2022

(30) Foreign Application Priority Data
Feb. 13, 2019 (GB) .................................... 1901952

(51) Int. Cl.
*G01F 25/20* (2022.01)
*G01F 23/296* (2022.01)
*G01F 23/22* (2006.01)

(52) U.S. Cl.
CPC .............. *G01F 25/20* (2022.01); *G01F 23/22* (2013.01); *G01F 23/2967* (2013.01)

(58) Field of Classification Search
CPC ...... G01F 25/20; G01F 25/24; G01F 23/2966; G01F 23/2967
See application file for complete search history.

(56) References Cited

U.S. PATENT DOCUMENTS 5,743,134 A * 4/1998 Dreyer ................ G01F 23/2967
73/290 V
7,146,845 B2  12/2006 Raffalt
(Continued)

FOREIGN PATENT DOCUMENTS

DE         3516200 A1   11/1986
DE    102016120326 A1    4/2018
(Continued)

OTHER PUBLICATIONS

European International Search Report and Written Opinion for International Application No. PCT/GB2020/050288, dated Apr. 17, 2020, 12 pages.

*Primary Examiner* — Herbert K Roberts
(74) *Attorney, Agent, or Firm* — Westman, Champlin & Koehler, P.A.

(57) ABSTRACT

The invention provides a method and apparatus for checking the condition of a self-oscillating vibrating fork level switch. The switch includes a test facility that operates when the switch is taken from a closed loop feedback operating mode into an open loop test mode. Amplitudes of the received test signals are subjected to comparison with predetermined thresholds to establish the health of the switch.

18 Claims, 3 Drawing Sheets

(56) References Cited

U.S. PATENT DOCUMENTS

| | | |
|---|---|---|
| 7,260,977 B2 | 8/2007 | Griessbaum et al. |
| 10,895,489 B2 | 1/2021 | Brengartner et al. |
| 2005/0210954 A1 | 9/2005 | Raffalt |
| 2006/0053863 A1 | 3/2006 | Griessbaum et al. |
| 2006/0267784 A1* | 11/2006 | Ferraro ............... G01F 23/2967 340/612 |
| 2012/0174671 A1 | 7/2012 | Urban |
| 2015/0047428 A1* | 2/2015 | Lopatin ............... G01F 23/0007 73/290 V |
| 2017/0038491 A1 | 2/2017 | Gonzalez et al. |
| 2018/0372534 A1* | 12/2018 | D'Angelico ............ G01F 25/24 |
| 2019/0242739 A1 | 8/2019 | Brengartner et al. |

FOREIGN PATENT DOCUMENTS

| | | |
|---|---|---|
| EP | 1580539 A1 | 9/2005 |
| EP | 1624291 A2 | 2/2006 |

* cited by examiner

VIBRATING FORK LEVEL SWITCHES

CROSS-REFERENCE TO RELATED APPLICATION

This Application is a Section 371 National Stage Application of International Application No. PCT/GB2020/050288, filed Feb. 7, 2020, which claims priority to the Great Britain Patent Application No. 1901952.0 filed on Feb. 13, 2019, and published as WO 2020/165560 A1 on Aug. 20, 2020, in English, the entire contents of which are hereby incorporated by reference in their entireties.

FIELD OF THE INVENTION

This invention relates to vibrating fork level switches and, in particular to a method of checking the condition of a vibrating fork level switch in situ; and a vibrating level fork configured to undertake such a method.

BACKGROUND TO THE INVENTION

Vibrating fork level switches are commonly used to detect when the surface of a fluid in a tank is at a particular level, that level being the height at which the fork is positioned in the tank. Typically fork level switches are configured to self-oscillate through a positive feedback loop in an electronic circuit where the phase delay between the transmitting and receiving elements is carefully tuned to ensure the positive feedback signal is in phase.

In operation, in "normally dry" applications, the frequency of vibration will be at one level when the fork is in air ('dry'), but will drop when the liquid in the tank rises into contact with the fork ('wet'). In "normally wet" applications the reverse applies and the frequency will rise as the liquid falls below the level of the fork.

Whilst being relatively simple in construction, vibrating fork level switches are used in situations where economic and personal loss can arise if the switches fail to operate as intended. There is therefore a need, particularly in safety critical applications, to check switch function from time to time.

Historically checking a switch normally involved shutting down the process in which the switch is used; removing the switch; testing the switch; re-mounting the switch; and re-starting the process. The testing process involves contacting the fork with a liquid or other damping element to simulate a wet or dry condition of the switch. Such a procedure necessarily involves the attendance on site of a service operative, but may also involve the breaking of seals and exposure of the service operative to unpleasant and/or dangerous materials.

EP 1580539 proposes a method for testing a vibrating fork having a feedback circuit configured to cause the fork to oscillate at its resonant frequency. The described method proposes varying one or more excitation parameters within the circuit that maintain self-oscillation and then comparing the resultant change to datasets comprising data of corresponding failure-free system. The excitation parameters are reflected in signal processing blocks under the control of a microprocessor. According to the description the microprocessor varies the operation of one of these processing blocks to create the test but it is not understood how, in practice, such a method could be achieved as a feedback circuit is carefully balanced and interfering with a parameter of the circuit will prevent it operating.

EP 1624291 proposes an alternative in which the fork is driven at a frequency beyond the resonant frequency range and then analysing the resultant amplitude signals. This apparatus requires an additional drive circuit and is incapable of diagnosing faults in the functionality of the existing circuit.

US2006/0267784 describes a tuning fork level switch having test functionality embodied in the operating microprocessor. The function test unit decreases the amplification of the input amplifier during the function test, while the fork is 'dry', to generate a test measurement signal which would result if the fork were wet. An evaluation unit then, in an error-free condition, evaluates the test measurement signal as a 'wet' signal.

It is an object of the invention to provide a method and/or apparatus to check switch function that will go at least some way in addressing the aforementioned problems and shortcomings in the prior art; or which will at least provide a novel and useful choice.

SUMMARY OF THE INVENTION

Accordingly, in one aspect, the invention provides a method of testing the function of a vibrating fork level switch configured to self-oscillate in a normal working mode by means of a closed feedback loop, said method comprising interrupting said normal working mode; driving said switch in an open-loop pulsed mode with a test signal generated by a test facility integrated into said switch; and comparing amplitudes of received test signals at a set of times with predetermined amplitude thresholds at corresponding times.

Preferably the received test signals are subjected to envelope detection.

Preferably said test signals are generated at a frequency related to a frequency observed in normal mode working prior to interruption thereof.

Preferably said switch includes an integral microcontroller, said method comprising using said microcontroller to generate said test signals.

Preferably said method includes generating a test driving signal of a discrete number of cycles.

Preferably said method further comprises programming said microcontroller to interrupt said normal working mode prior to generating said test signal.

Alternatively the act of interrupting said normal working mode is effected by manual intervention.

Preferably said manual intervention is effected from a remote location.

Preferably said method further comprises providing a visual indication of a condition of said switch.

Preferably said method comprises providing an indication of an existence of fault as well as a nature thereof.

In a second aspect the invention provides a vibrating fork level switch configured to self-oscillate in a normal working mode by means of a closed feedback loop, said switch further including a test facility operable, on interruption of said normal working mode, in an open-loop pulsed mode, said test facility being configured and operable to drive said switch with a test signal and to compare amplitudes of received test signals at a set of times with predetermined amplitude thresholds at corresponding times.

Preferably said vibrating fork level switch further includes an envelope detection facility configured for application to received test signals.

Preferably said test facility is configured to generate test signals at a frequency related to a frequency observed in normal mode working prior to interruption thereof.

Preferably said vibrating fork level switch includes an integral microcontroller, said test facility being integrated at least in part, in said microcontroller.

Preferably said microcontroller is configured or programmed to generate a test signal of a discrete number of cycles.

Preferably said microcontroller is programmed to interrupt said normal working mode prior to operation of said test facility.

Alternatively said vibrating fork level switch further includes a control to effect interruption of said normal working mode and to initiate operation of said test facility.

Preferably said control is operable manually or remotely by manual or process control intervention.

Preferably said test facility is further operable to provide a visual indication of a condition of said switch.

Preferably said vibrating fork level switch includes an LED lamp programmed to indicate an existence of a fault as well as a nature thereof.

Many variations in the way the present invention can be performed will present themselves to those skilled in the art. The description which follows is intended as an illustration only of one means of performing the invention and the lack of description of variants or equivalents should not be regarded as limiting. Subject to the scope of the appended claims, wherever possible, a description of a specific element should be deemed to include any and all equivalents thereof whether in existence now or in the future.

BRIEF DESCRIPTION OF THE DRAWINGS

One preferred form of the invention will now be described with reference to the accompanying drawings in which.

DETAILED DESCRIPTION OF WORKING EMBODIMENT

Figure 1:
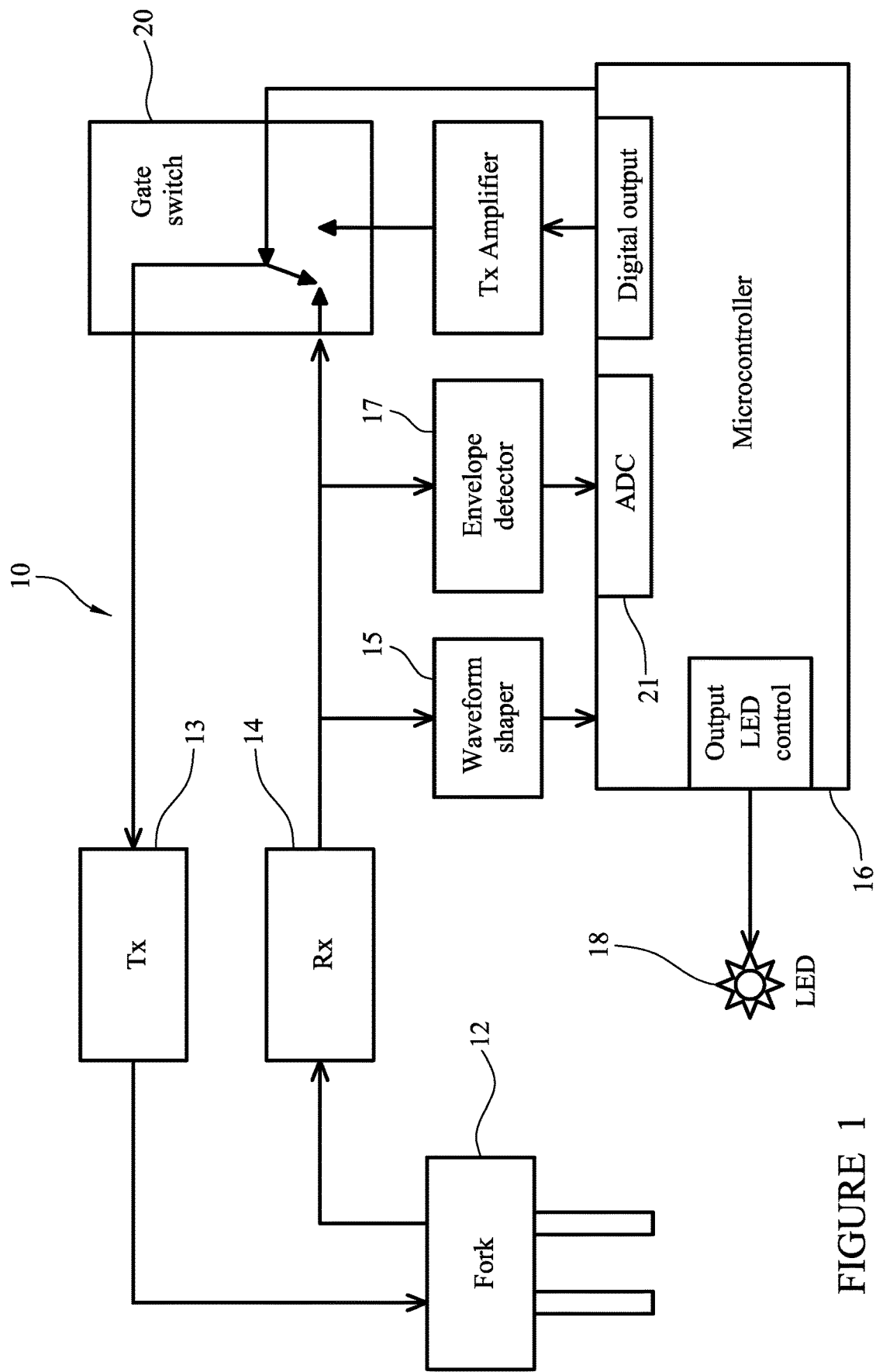
FIG. 1: shows a schematic hardware diagram for performing fault detection according to the invention.

Referring to the drawings the invention provides a method of checking the operation and/or condition of a vibrating fork level switch 10 without removing or disturbing the switch from its normal operating position. The invention further provides a level switch configured with an internal fault checking or testing facility such that the functionality of the switch can be checked or tested while the switch is in situ. As will be apparent from the description that follows, the test procedure and apparatus can also encompass fault finding and diagnosis.

Referring to FIG. 1, the level switch 10 conventionally works in self-oscillating mode, fork 12 being driven by piezo drive element Tx 13 and the resulting fork vibration being sensed by piezo sensing element Rx 14. In the conventional manner a positive feedback loop in the electronic circuit, which contains suitable amplifiers and filters, establishes and maintains the fork 12 vibrating in resonance. The Rx signal is also fed to a waveform shaper 15 and thence to microcontroller 16 which compares the Rx frequency with one or more thresholds to determine if there has been a change of medium in contact with the fork 12.

In its broadest form, the invention involves integrating a test facility into the switch 10. This is conveniently implemented by adding additional hardware such as further drive and receive amplifiers to the microcontroller 16 which enable the normal operating cycle of the switch to be interrupted and an open loop test mode initiated in which test signals are generated to drive the existing transmit element 13 to vibrate the fork. The responses to the test signals are then picked up by the existing Rx sensor 14 and subjected to analysis preferably by passing the received test signals to an envelope detector 17 in which the amplitudes of the received test signals are recorded and compared by microcontroller 16 with predetermined thresholds at a given set of times. In essence this allows the rate of decay of the test signal to be observed. Based on a comparison with known data, the patterns of receive signal decay can be translated into an indication of the health of the vibrating fork sensor. This indication can then be outputted by way of a visual indicator such as LED lamp 18.

To enable the normal self-oscillating working mode of the switch 10 to be interrupted, and the fork 12 to be driven in open-loop test mode, a gate switch 20 is conveniently included in the feedback loop such that the feedback can be interrupted and the test signal from microcontroller 16 applied to the transmit element 13. At the end of a test cycle the gate switch is re-positioned to re-establish the working closed feedback loop. The gate switch may be operated under the control of microcontroller 16 or may include an additional control that allows external intervention to effect switching. This additional control may permit manual operation of the gate switch 20 and/or may allow remote operation of the gate switch via a wired or wireless communication facility.

The test signals are conveniently 50 cycle square waveforms, the frequencies of which may be set in a number of different ways.

Firstly, the test frequency may be set to the normal 'dry' or normal 'wet' frequency depending on what the switch is indicating immediately prior to the test cycle being initiated. Secondly the frequency observed prior to interruption of the working mode and initiation of the test cycle, is used for the test signal. A third option is to apply test cycles over a range of frequencies looking for a point at which the fork will resonate. Obviously, if no resonance is observed during this sweep of different frequencies, it can be concluded that the switch is not functioning.

Those skilled in the art will appreciate that the microcontroller 16 can be programmed to effect any one or more of the above options.

Following transmission of the test signal the resultant response or receive signal is passed to an envelope detector 17. Thereafter, the microcontroller 16, by way of analogue to digital convertor 21, samples the amplitudes within the envelope at, say, times 0.2 ms, 20 ms, 40 ms, 60 ms, & 80 ms. The amplitudes at each time point are then compared to pre-set threshold values to determine if the switch is operating in an acceptable manner. As stated above, a visual indication of the health of the switch may be provided by way of LED lamp 18. This, in turn, can be programmed to indicate different forms of fault.

Figure 2:
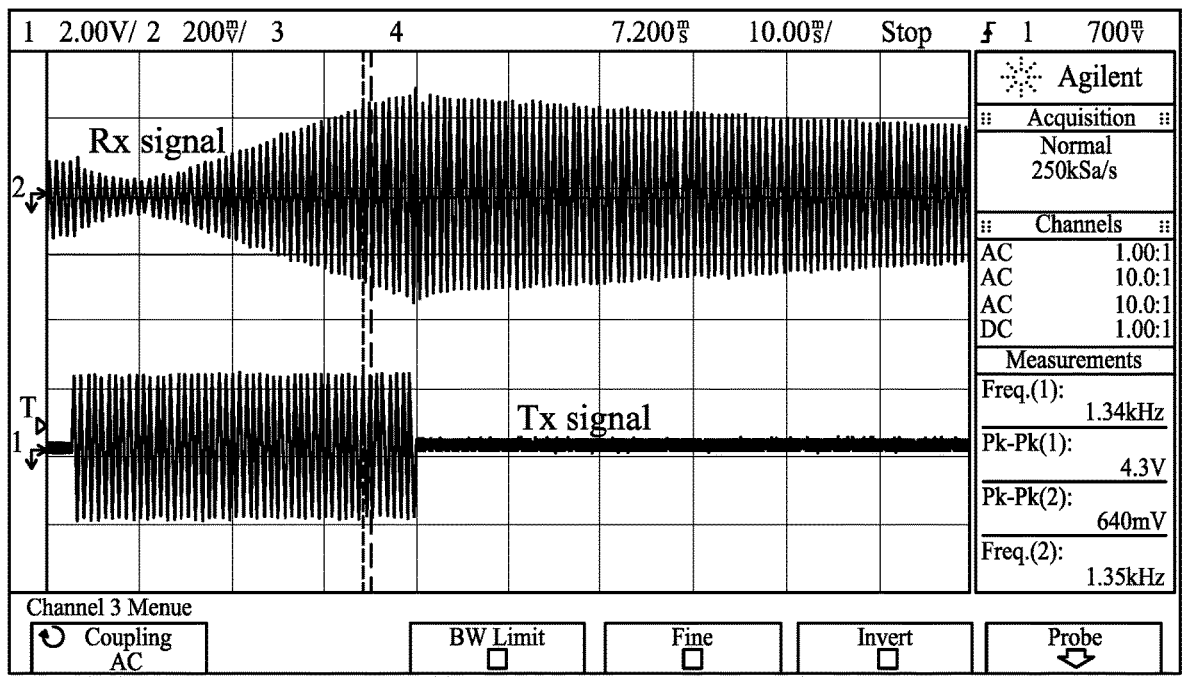
FIG. 2: shows a frequency response of a vibrating fork level switch operating in air where the frequency of the drive signal is at the resonant frequency of the fork in air.

Referring now to FIG. 2, the test transmit pulse is shown in the bottom part of the figure while the response of the fork, which is in air, is shown above. It will be noted that the signal decay upon termination of the test pulse is relatively gradual indicating a switch in good condition.

Figure 3:
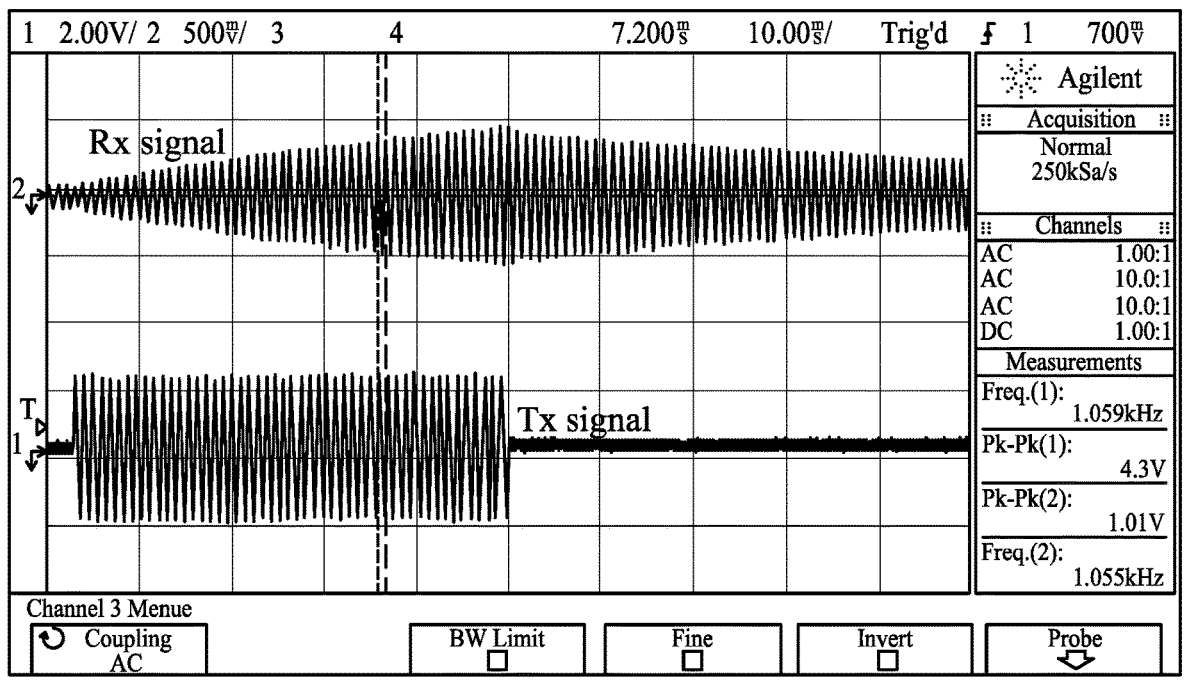
FIG. 3: shows a frequency response of a vibrating fork level switch operating in water where the frequency of the drive signal is at the resonant frequency of the fork in water.

FIG. 3 shows a similar test to FIG. 2 but with the fork in water. While the amplitudes of the receive signal or response are lower overall, due to the damping effect of water, once again the decay after termination of the transmitted test pulse is relatively gradual, indicating a switch in good condition.

Figure 4:
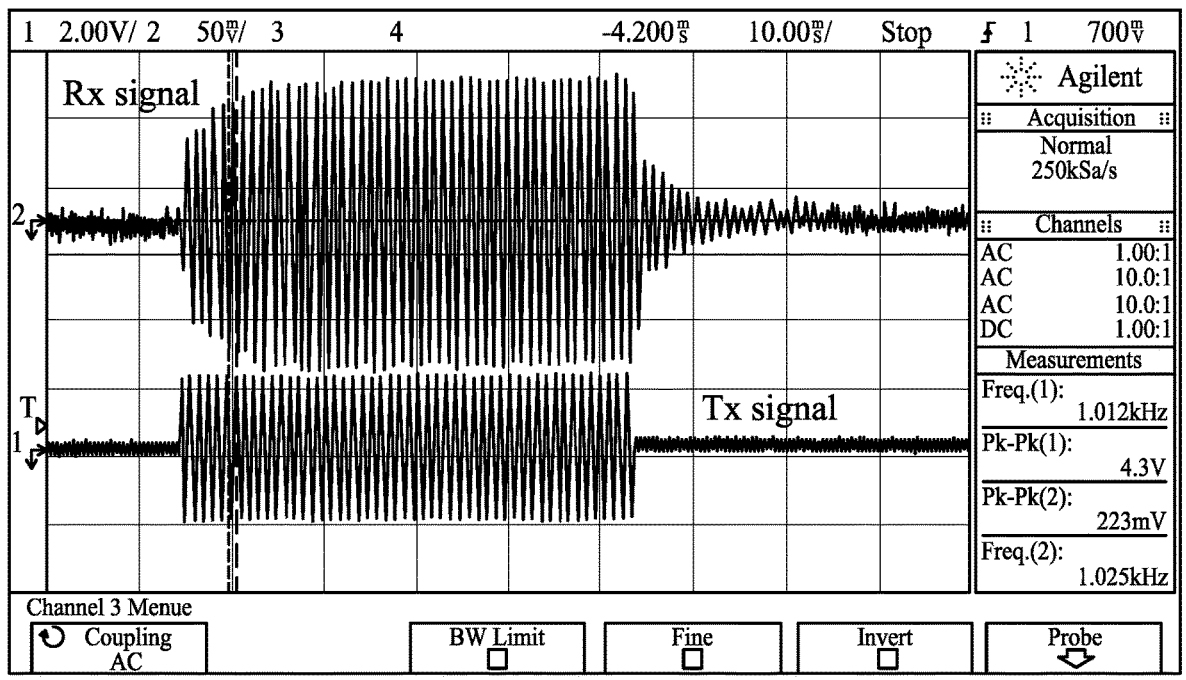
FIG. 4: shows a frequency response of a vibrating fork level switch operating in silicon oil at the resonant frequency of the fork.
Figure 5:
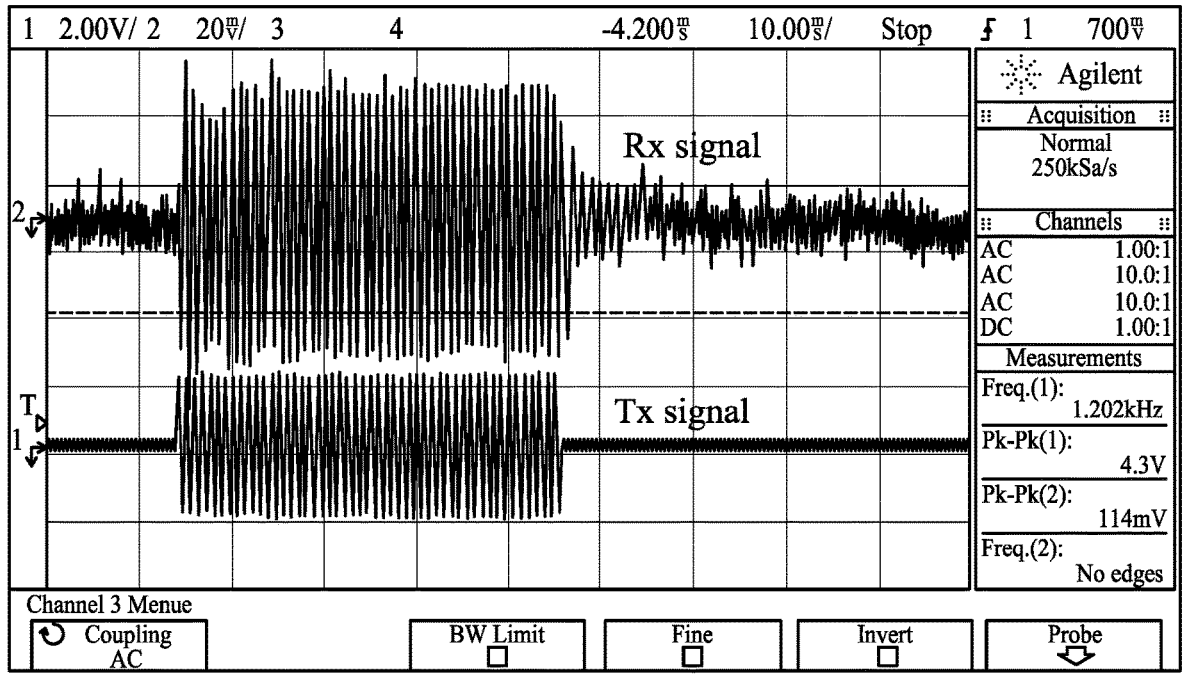
FIG. 5: shows a frequency response of a vibrating fork level switch operating as in FIG. 4 but not in resonance and indicating the presence of a fault, the amplitude scale being less than that of FIG. 4.

FIGS. 4 and 5 are simulations to provide a comparison between a switch in good operating condition, and a faulty switch. FIG. 4 shows the response of a switch, operating in silicon oil which is fairly viscous (1086 cp). As expected in fluids of such viscosity, the response decays quite rapidly upon termination of the test signal, even though the switch may otherwise be in good condition. FIG. 5 is a simulation of a defective switch operating in the same conditions. In FIG. 5, the amplitude (vertical) scale is nearly twice that of FIG. 4 so the amplitudes of the receive signal depicted are about half those of FIG. 4 even when the test signal is still transmitting. Given that the transmit or test signal is the same, this is an indication that a fault is present in the switch.

The invention as described above enables the identification and indication of faults such as:
Correct/wrong fork condition when dry
Correct/wrong fork condition when wet
A broken wire within the switch
Dis-bonding or decay of bonding in the sensor drive/receive assembly;
Damage to a fork tine.

These faults may be characterized by suitable programming of the microcontroller 16 and indicated individually by programming the operation of the LED lamp 18, for example by allocating different flashing rates or different colours to different faults.

Thus the present invention not only enables a vibrating fork level switch to tested in situ but also, by using a communications facility in such a switch, may be tested remotely which is of considerable advantage in this art.

What is claimed is:

1. A method of testing the function of a vibrating fork level switch configured to self-oscillate in a normal working mode by means of a closed feedback loop, said method comprising interrupting said normal working mode; driving said switch in an open-loop pulsed working mode with a test signal generated by a test facility integrated into said switch; and comparing amplitudes of received test signals at a set of times with predetermined amplitude thresholds at corresponding times, wherein said test signals are generated at a frequency related to a frequency observed in normal mode working prior to interruption thereof.

2. A method as claimed in claim 1, wherein the received test signals are subjected to envelope detection.

3. A method as claimed in claim 1, wherein said switch includes an integral microcontroller, said method comprising using said microcontroller to generate said test signals.

4. A method as claimed in claim 3 comprising generating a test driving signal of a discrete number of cycles.

5. A method as claimed in claim 3, further comprising programming said microcontroller to interrupt said normal working mode prior to generating said test signals.

6. A method as claimed in claim 1, wherein the act of interrupting said normal working mode is effected by manual intervention.

7. A method as claimed in claim 6, wherein said manual intervention is effected from a remote location.

8. A method as claimed in claim 1, further comprising providing a visual indication of a condition of said switch.

9. A method as claimed in claim 8, comprising providing an indication of an existence of fault as well as a nature thereof.

10. A vibrating fork level switch configured to self-oscillate in a normal working mode by means of a closed feedback loop, said switch further including a test facility operable, on interruption of said normal working mode, in an open loop pulsed test mode, said test facility being configured and operable to drive said switch with a test signal and to compare amplitudes of received test signals at a set of times with predetermined amplitude thresholds at corresponding times, wherein said test facility is configured to generate test signals at a frequency related to a frequency observed in normal mode working prior to interruption thereof.

11. A vibrating fork level switch as claimed in claim 10, further including an envelope detection facility configured for application to received test signals.

12. A vibrating fork level switch as claimed in claim 10, including an integral microcontroller, said test facility being integrated at least in part, in said microcontroller.

13. A vibrating fork level switch as claimed in claim 12, wherein said microcontroller is configured or programmed to generate a test signal of a discrete number of cycles.

14. A vibrating fork level switch as claimed in claim 12 wherein said microcontroller is programmed to interrupt said normal working mode prior to operation of said test facility.

15. A vibrating fork level switch as claimed in claim 10, further including a control to effect interruption of said normal working mode and to initiate operation of said test facility.

16. A vibrating fork level switch as claimed in claim 15 wherein said control is operable manually or remotely by manual or process control intervention.

17. A vibrating fork level switch as claimed in claim 10, wherein said test facility is further operable to provide a visual indication of a condition of said switch.

18. A vibrating fork level switch as claimed in claim 16, including an LED lamp programmed to indicate an existence of a fault as well as a nature thereof.

* * * * *